Patented Jan. 9, 1934

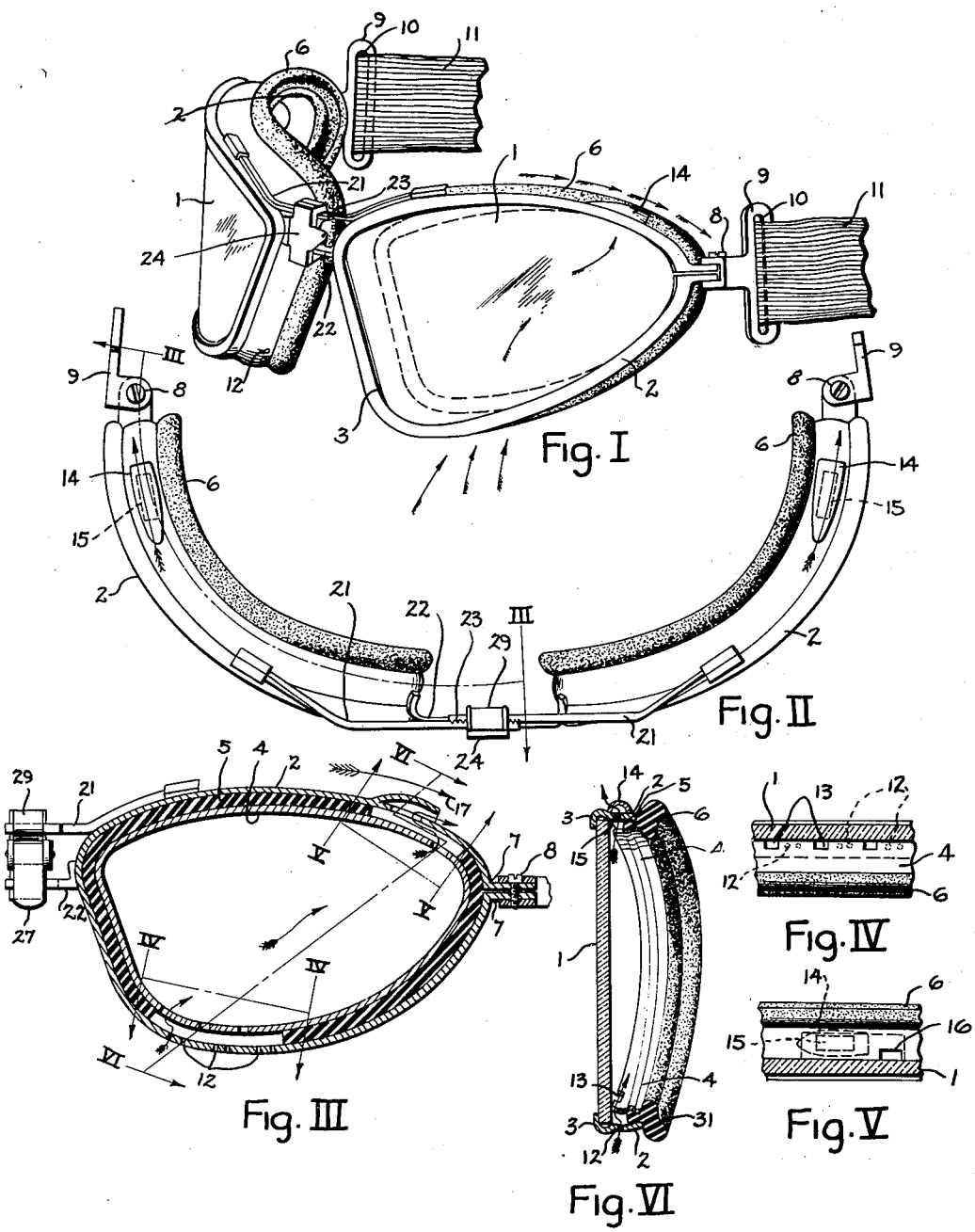

1,942,394

UNITED STATES PATENT OFFICE 1,942,394

GOGGLES

Nelson M. Baker, Southbridge, Mass., assignor to American Optical Company, Southbridge, Mass., a voluntary association of Massachusetts Original application June 15, 1927, Serial No. 199,013. Divided and this application May 2, 1932. Serial No. 608,764

13 Claims. (Cl. 2—14)

This invention relates to improvements in goggles and the like and has particular reference to a goggle used for the purposes of aviation.

This application is a division of my prior pending application Serial No. 199,013 filed June 15, 1927.

One object of this invention is to provide a pair of wide vision lenses with means for holding them rigidly in proper relation to the eyes of the wearer.

Another object of the invention is to provide improved resilient face contacting members for the eyecup together with facile means for attaching the same.

Another object of this invention is to provide improved resilient face contacting means for the eyecup, which means are formed to cooperate with ventilating openings in the eyecup.

Another object of this invention is to provide improved ventilation for an eyecup, in which the face contacting means has cut away portions to allow the proper functioning of the ventilating means for the eyecup.

Another object of this invention is to provide improved means for attaching a resilient face contacting member to the eyecup of a goggle whereby such resilient face contacting member will be interchangeable or detachable so as to allow replacement.

One other object of this invention is to provide an improved means for attaching and locking the resilient face contacting members to an eyecup, by which the face contacting member may be quickly and readily removed.

Other objects and advantages of the invention will become apparent from the following description taken in connection with the accompanying drawing and it will be understood that many changes may be made in the arrangement and details of parts without departing from the spirit of the invention as set forth in the accompanying claims. I, therefore, do not wish to be limited to the exact details shown and described, the preferred forms only having been shown by way of illustration.

Referring to the drawing:

Figure I is a perspective side and front view of the device of this invention.

Figure II is a top or plan view of said device.

Figure III is a cross section on line III—III of Figure II.

Figure IV is a partial section on line IV—IV of Figure III looking in the direction of the arrows.

Figure V is a partial section on the line V—V of Figure III looking in the direction of the arrows.

Figure VI is a cross section on the line VI—VI of Figure III.

Up to the present time it has been customary to provide aviation and other types of protection goggles with the so-called plano or no-power lenses. It has been found however in lenses of this type that there were distortions and refractive errors present and that to obtain the ideal conditions for the wearer's eyes the lenses should be designed with a proper center and should be securely held before the eyes of the wearer in this centered position. Lenses of this character have been recently designed by the assignee of this application and it is one of the objects of this invention to provide suitable holding means for these lenses. It has also been customary to make aviation goggles with a so-called hinged bridge or connecting member. It is clear that with a loose or hinged bridge connection the required relationship between the lenses and the eye cannot be maintained. The present invention has been designed to overcome this difficulty.

It is also well known that considerable air currents are produced by the contacts of the lenses with the air due to the swift motion of the flyer through the air and this condition has been utilized in this invention to cause a suction through the eyecup which provides instant and continually changing ventilation in the eyecup to prevent sweating, steaming, fogging, etc., of the lenses.

Another objection to aviation goggles has been the limited field of vision. In the present invention the widest possible range of vision has been obtained with centered lenses which are rigidly and accurately secured in proper alignment with the eyes of the wearer.

Referring to the drawing in which similar reference characters are used to denote corresponding parts throughout a pair of properly centered and designed wide vision lenses 1 are mounted in an eyecup frame 2 having a front flange or lens retaining seat 3. The frame 2 is shaped in general contour to that of the orbital arch of the wearer's face. On the inside of the eyecup frame 2 and spaced therefrom is a retaining frame 4. Between the frame 2 and the retaining frame 4 is a projecting portion 5 of a resilient face contacting member 6. This face contacting member is preferably of rubber or other soft and resilient contacting substance. The resilient member 6 is held between the members 2 and 4, either by sewing through the projecting portion 5, or cementing, riveting, or other means to secure it to the retaining frame 4. The projecting portion 5 is also subject to a clamping action because of the bringing together of the endpieces 7 of the frame 2 by means of the holding screw 8 which carries the headband or temple connection 9 which is pivoted on the screw 8 as clearly indicated in section in Figure III.

The face contacting member 6 can be quickly removed by loosening the endpiece screw 8, removing the headband connection 9 and springing the frame 2 apart at the endpieces 7. The retaining frame 4 being secured to the face contacting member 6 will be removable therewith and serves to keep the face contacting member 6 in shape. Should a lens be broken, it can readily be replaced by the same process of loosening the endpiece screw 8 and springing the frame 2 apart.

The temple connection 9 is slotted at 10 and an elastic headband 11 is entered through the opening 10 and secured in place around the member 9 by sewing or otherwise. The elastic headband 11 may be provided with a buckle or other means for adjusting it to the head of the wearer.

The ventilation for the eyecup frame 2 is best shown in Figure III. At the bottom of the frame 2 are a number of perforations or openings 12 and through the inner frame 4 are other openings 13 which are placed in staggered relation or out of line with the opening 12. The projection 5 of the resilient member 6 in the space between the frames 2 and 4 adjacent the openings 12 and 13 has been cut away to allow for the passage of air.

Figure IV shows the staggered relation of the openings 12 and 13 and their shape, the opening 12 being preferably circular and the opening 13 of a rectangular form. On the opposite side or at the top of the eyecup frame, best shown in Figure III there is provided a tubular channel member 14 closed on the nose side of the cup but opened on the outer end. Under this tube or hood 14 is an opening 15 in the frame 2 and in staggered relation thereto an opening 16 in the inner frame 4. The projection 5 of the resilient member 6 has been cut away between the members 2 and 4 adjacent the openings 15 and 16. It will be apparent that the air rushing over the end of the opening of the member 14 as indicated by the arrow 17, will cause a suction at the open end of the tubular member 14 tending to exhaust the air from the inside of the eyecup frame 2. This in turn tends to suck the air through the openings 12 and 13, thus causing a constant ventilation through the eyecup from the opening 12 out through the opening 15, which will prevent fogging and steaming of the lenses.

The eyecup frames 2 are connected with each other by two ductile bridges or spacing members 21 and 22 respectively, 21 being the upper connection, and 22 the lower connection. Both the connecting members 21 and 22 are divided and overlap each other being provided in the way of their overlapping portion with the teeth 23 which inter-engage each other. The ends of these members opposite their overlapping portions are soldered or otherwise secured to the eyecup frame 2. These members are ductile so that they may be bent by the exertion of pressure, but they are rigid enough to maintain the two eyecup frames in adjusted position from which they are not readily deflected. Inter-engaging with the bridge members 21 and 22 is a clamping member 24 which may be of any suitable construction for the purpose of firmly clamping the parts together.

From the foregoing description it will be seen that I have provided simple, efficient, and inexpensive means for carrying out all the objects of the invention and that I have provided ready and facile means for adjusting such a goggle to the facial requirements of the wearer and then locking the parts in such a way as to rigidly maintain the said relationship. Furthermore, I have provided an interchangeable or detachable rubber or other cushioning face contacting member which is cut away adjacent the ventilating openings in the eyecup for the purpose of enabling the ventilating means to properly function. I have also provided simple and efficient means for quickly and readily detaching this rubber or resilient cushioning member.

Having described my invention, I claim:

1. In a device of the character described, an outer eyecup frame adapted to hold a lens and having an intake opening on one side thereof and an outlet opening on the opposite side thereof, an inner eyecup frame spaced from and substantially parallel to the outer eyecup frame and having an intake opening on one side thereof and an outlet opening on the opposite side thereof in offset relation to the openings of the outer eyecup frame, a rubber face contacting member having a portion held between the outer and inner eyecup frames, said portion of the rubber between the frames being cut away adjacent the intake and outlet openings to allow the passage of air therethrough.

2. In a device of the character described, an outer eyecup frame adapted to hold a lens, and having offset terminal ends abutting one on the other, a member holding the offset ends together, an inner eyecup frame spaced from and substantially parallel to the outer eyecup member, a resilient face contacting member having a portion extending between the inner and outer eyecup frames, said means for uniting the offset ends of the outer eyecup being operative against the compression of the resilient means between the two eyecup frames to hold the resilient means therebetween, and the two endpieces together.

3. In a device of the character described, an outer eyecup frame adapted to hold a lens and having an intake opening on one side thereof, and an outlet opening on the opposite side thereof, an inner eyecup frame spaced from and substantially parallel to the outer eyecup frame, and having an intake opening on one side thereof, and an outlet opening on the opposite side thereof, in offset relation to the openings of the outer eyecup frame, a rubber face contacting member having a portion held between the outer and inner eyecup frames, said portion of the rubber between the frames being cut away adjacent an opening to allow the passage of air therethrough.

4. In a device of the character described, an outer eyecup frame adapted to hold a lens and having an intake opening on one side thereof, and an outlet opening on the opposite side thereof, an inner eyecup frame spaced from and substantially parallel to the outer eyecup frame, and having an intake opening on one side thereof, and an outlet opening on the opposite side thereof, in offset relation to the openings of the outer eyecup frame, a resilient face contacting member having a portion held between the outer and inner eyecup frames, said portion of the resilient face contacting member between the frames being cut away adjacent an opening to allow the passage of air therethrough.

5. In a device of the character described, an eyecup frame adapted to hold a lens and having an intake opening on one side thereof and an outlet opening on the opposite side thereof, a hood member over one of said openings having one end open, the longitudinal axis of which is substantially parallel with the plane of the lens and so positioned that an open end will be in a rearward direction when the eyecup frame is on the face of the wearer, and a face contacting member on the eyecup frame, having a portion cut away adjacent the intake and outlet openings whereby passage of air over the hood member will cause suction to draw air through the openings to ventilate the eyecup.

6. An interchangeable face contacting member for use in combination with a goggle eyecup having means to receive it comprising a rim shaped to fit within the goggle eyecup and a resilient member having a face engaging portion and a rib on the opposite side thereof, said rib being secured to said rim independently of the goggle eyecup and said face engaging portion extending beyond said rim.

7. In a device of the character described, an outer eyecup frame having its inner end shaped substantially to a face contacting contour and adapted to hold a lens and having offset terminal ends abutting one on the other, a member holding the offset ends together, an inner eyecup frame having its inner end shaped substantially to the same contour as the inner end of the outer eyecup member and secured within the outer eyecup member and separable therefrom without deformation of parts, a resilient face contacting member having a portion shaped to the contour of the face and having a portion secured to the inner eyecup frame, said means for uniting the offset ends of the outer eyecup being operative against the resiliency of the outer eyecup member, tending to separate the offset ends, said inner ends of the eyecup members and the secured portion of the face contacting member overlying each other.

8. In a device of the character described, an outer eyecup frame having its inner ends shaped to substantially a face contacting contour and adapted to hold a lens, and having offset terminal ends abutting one on the other, an inner eyecup frame having its inner end shaped substantially to a face contacting contour, a resilient face contacting member having its contacting portion shaped substantially to a face contacting contour and having a portion secured to the inner eyecup frame and separable means for holding the offset ends together to secure the inner eyecup frame within the outer eyecup frame so that they may be separated without deformation of parts, said inner ends of the two eyecups and the secured portion of the face contacting member overlying each other.

9. In a device of the character described, an outer eyecup frame having its inner end shaped substantially to a face contacting contour and adapted to hold a lens and having offset terminal ends abutting one on the other, an inner eyecup frame having its inner end shaped substantially to a face contacting contour, a resilient face contacting member having a portion shaped to fit the orbital rim of the eye and having a portion secured to the inner eyecup frame and separable means for holding the offset ends together to secure the inner eyecup frame within the outer eyecup frame so that they may be separated without deformation of parts, said inner ends of the eyecup frames and the portion of the face contacting member secured to the inner frame overlying each other.

10. In a device of the character described, an outer eyecup frame having its inner end shaped substantially to a face contacting contour and adapted to hold a lens and having terminal ends abutting one on the other, a member holding the terminal ends together, an inner eyecup frame having its inner end shaped substantially to the same contour as the inner end of the outer eyecup member and secured within the outer eyecup member and separable therefrom without deformation of parts, a resilient face contacting member having a portion shaped to the contour of the face and having a portion secured to the inner eyecup frame, said means for uniting the terminal ends of the outer eyecup being operative against the resiliency of the outer eyecup member tending to separate the terminal ends, said inner ends of eyecup members and the secured portion of the face contacting member overlying each other.

11. In a device of the character described, an outer eyecup frame having its inner end shaped to substantially a face contacting contour and shaped to hold a lens, and having terminal ends abutting one on the other, an inner eyecup frame having its inner end shaped substantially to a face contacting contour, a resilient face contacting member having its contacting portion shaped substantially to a face contacting contour and having a portion secured to the inner eyecup frame and separable means for holding the terminal ends together to secure the inner eyecup frame within the outer eyecup frame so that they may be separated without deformation of parts, said inner ends of the two eyecups and the secured portion of the face contacting member overlying each other.

12. In a device of the character described, an outer eyecup frame having its inner end shaped substantially to a face contacting contour and adapted to hold a lens and having terminal ends abutting one on the other, an inner eyecup frame having its inner end shaped substantially to a face contacting contour, a resilient face contacting member having a portion shaped to fit the orbital rim of the eye and having a portion secured to the inner eyecup frame and separable means for holding the terminal ends together to secure the inner eyecup frame within the outer eyecup frame so that they may be separated without deformation of parts, said inner ends of the eyecup frames and the portion of the face contacting member secured to the inner frame overlying each other.

13. In a device of the character described, an outer eyecup frame adapted to hold the lens, and having terminal ends lying adjacent each other, a member holding the terminal ends together, an inner eyecup frame spaced from and substantially parallel to the outer eyecup frame, a resilient face contacting member having a portion extending between the inner and outer eyecup frames, said means for holding the terminal ends of the outer eyecup together being operated against the compression of the resilient means between the two eyecup frames to hold the resilient means therebetween, and the two endpieces together.

NELSON M. BAKER.